United States Patent
Byun (10) Patent No.: US 11,416,366 B2
(45) Date of Patent: Aug. 16, 2022

(54) CONTROLLER AND MEMORY SYSTEM HAVING THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

(\*) Notice: Subject to any disclaimer, the term of this patent is extended or adjusted under 35 U.S.C. 154(b) by 421 days.

(21) Appl. No.: 16/719,055

(22) Filed: Dec. 18, 2019

(65) Prior Publication Data
US 2020/0356455 A1    Nov. 12, 2020

(30) Foreign Application Priority Data

May 9, 2019  (KR) .......................... 10-2019-0054505

(51) Int. Cl.
*G06F 12/00*    (2006.01)
*G06F 11/30*    (2006.01)
*G06F 12/02*    (2006.01)
*G06F 13/42*    (2006.01)

(52) U.S. Cl.
CPC ...... *G06F 11/3037* (2013.01); *G06F 12/0246* (2013.01); *G06F 12/0253* (2013.01); *G06F 13/4221* (2013.01); *G06F 2212/7205* (2013.01); *G06F 2212/7211* (2013.01)

(58) Field of Classification Search
CPC ............ G06F 11/3037; G06F 12/0246; G06F 12/0253; G06F 13/4221; G06F 2212/7205; G06F 2212/7211
See application file for complete search history.

(56) References Cited

U.S. PATENT DOCUMENTS 10,209,894 B2 \* 2/2019 Kanno ................ G06F 12/0246

FOREIGN PATENT DOCUMENTS

KR   10-2015-0106778       9/2015

OTHER PUBLICATIONS

Baek, S.H, Issues of Lifetime and Reliability, issues of Reliability/Lifetime of MLC Storage, Apr. 19, 2010, pp. 4, NVRAMOS 2010.

\* cited by examiner

*Primary Examiner* — Shawn X Gu
(74) *Attorney, Agent, or Firm* — IP & T Group LLP (57) ABSTRACT

There are provided a controller and a memory system having the same. The controller includes: a background operation manager configured to determine a background operation level according to an amount of first data received from a host and an amount of second data generated in a randomization operation and an error check operation of the first data, and output a background operation signal according to the background operation level, and a processor configured to output a background command set by adjusting an operating ratio of a background operation according to the background operation signal.

16 Claims, 9 Drawing Sheets

CONTROLLER AND MEMORY SYSTEM HAVING THE SAME

CROSS-REFERENCE TO RELATED APPLICATION

The present application claims priority under 35 U.S.C. § 119(a) to Korean patent application number 10-2019-0054505, filed on May 9, 2019, which is incorporated herein by reference in its entirety.

BACKGROUND

Field of Invention

The present disclosure generally relates to a controller and a memory system having the same, and more particularly, to a controller capable of performing a background operation and a memory system having the controller.

Description of Related Art

A memory system may include a storage device and a controller.

The storage device may include a plurality of dies capable of storing data. Each of the dies may include a plurality of memory cells in which data is stored. The memory cells may be implemented as volatile memory cells in which stored data disappears when the supply of power is interrupted, or be implemented as nonvolatile memory cells in which stored data is retained even when the supply of power is interrupted.

The controller may control data communication between a host and the storage device. For example, the controller may control the storage device in response to a request from the host. Also, the controller may perform a background operation without any request from the host so as to improve the performance of the memory system. For example, the controller may perform garbage collection or read reclaim.

Garbage collection is a function of copying valid data stored in victim blocks to a target block when the number of free blocks is less than a reference number, and increasing the number of free blocks by erasing the victim blocks. Read reclaim is a function of copying data to another block so as to prevent read disturb of a corresponding block, when a read count value obtained by performing a read operation is greater than a reference value.

The host may communicate with the storage device through the controller by using an interface protocol such as Peripheral Component Interconnect-Express (PCI-e or PCIe), Advanced Technology Attachment (ATA), Serial ATA (SATA), Parallel ATA (PATA), or Serial Attached SCSI (SAS). Alternatively, any of various other interface protocols, such as a Universal Serial Bus (USB), a Multi-Media Card (MMC), an Enhanced Small Disk Interface (ESDI), and Integrated Drive Electronics (IDE) may be used.

SUMMARY

Embodiments provide a controller capable of controlling a background operation according to a state of a memory system and a memory system having the controller.

In accordance with an aspect of the present disclosure, there is provided a controller including: a background operation manager configured to determine a background operation level according to an amount of first data received from a host and an amount of second data generated in a randomization operation and an error check operation of the first data, and output a background operation signal according to the background operation level; and a processor configured to output a background command set by adjusting an operating operation of a background operation according to the background operation signal.

In accordance with another aspect of the present disclosure, there is provided a controller including: a calculator configured to calculate a wear acceleration index (WAI) level by performing a calculation operation on an amount of first data and an amount of second data; a background operation level determination component configured to output a background operation level corresponding to the WAI level, and a background operation signal generator configured to output a background operation signal such that an operating ratio of a background operation is adjusted in response to the background operation level.

In accordance with still another aspect of the present disclosure, there is provided a memory system including: a storage device including a plurality of memory blocks; and a controller configured to control the storage device in response to a request from a host, wherein the controller calculates a wear acceleration index (WAI) level according to an amount of first data received from the host and an amount of second data written to the storage device, and outputs a background command set to the storage device by adjusting an operating ratio of a background operation according to the calculated WAI level.

In accordance with still another aspect of the present disclosure, there is provided a memory system including: a storage device including a plurality of memory blocks, and a controller suitable for: receiving a plurality of items of data from a host, writing some items of data among the plurality of items of data to the storage device, and performing a background operation on the storage device based on a ratio of the received data to the written data.

BRIEF DESCRIPTION OF THE DRAWINGS

Various embodiments are described more fully below with reference to the accompanying drawings; however, the present invention may be embodied in different forms and thus is not limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element Is referred to as being "between" two elements, it can be the only element between the two elements, or one or more intervening elements may also be present. Like reference numerals refer to like elements throughout. Also, throughout the specification, reference to "an embodiment," "another embodiment" or the like is not necessarily to only one embodiment, and different references to any such phrase are not necessarily to the same embodiment(s).

DETAILED DESCRIPTION

With respect to the present disclosure, advantages, features and methods for achieving them will become more apparent in light of the description of various embodiments taken in conjunction with the drawings. The present invention may, however, be embodied in different forms and should not be construed as being limited to the embodiments set forth herein. Rather, these embodiments are provided to describe the present disclosure in detail to the extent that those skilled in the art to which the disclosure pertains may easily practice the present invention.

Throughout the specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include one or more other components instead of excluding other components unless stated otherwise.

Figure 1:
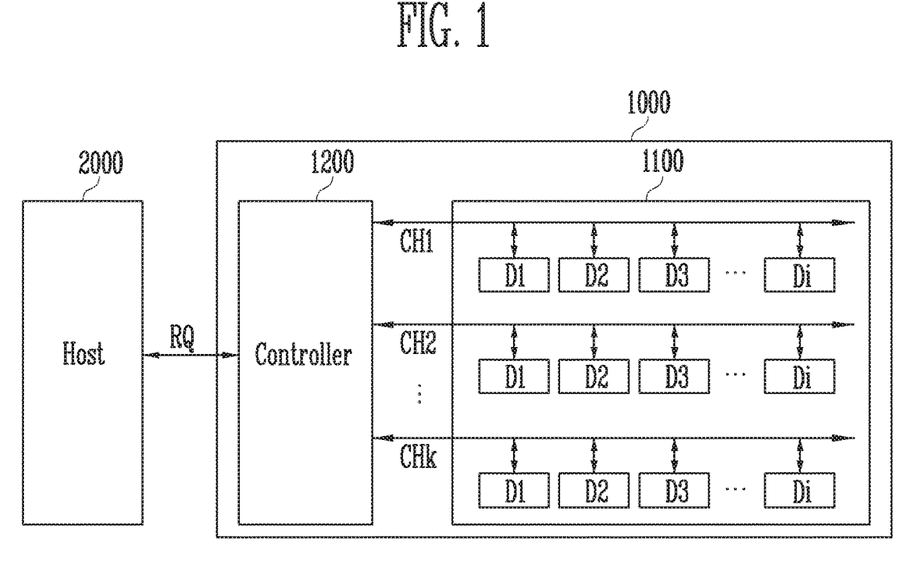
FIG. 1 is a diagram illustrating a memory system in accordance with an embodiment of the present disclosure.

FIG. 1 is a diagram illustrating a memory system in accordance with an embodiment of the present disclosure.

Referring to FIG. 1, the memory system 1000 may include a storage device 1100 configured to store data and a controller 1200 configured to control the storage device 1100.

The storage device 1100 may include a plurality of dies D1 to Di (where i is a positive integer greater than 1). The dies D1 to Di may be implemented with a volatile memory device in which stored data disappears when the supply of power is interrupted or a nonvolatile memory device in which stored data is retained even when the supply of power is interrupted. In the following embodiments, the memory system including the dies D1 to Di implemented with the nonvolatile memory device is described as an example. The nonvolatile memory device may be a NAND flash memory device.

The storage device 1100 may communicate with the controller 1200 through a plurality of channels CH1 to CHk (where k is a positive integer greater than 1). For example, the dies D1 to Di in the storage device 1100 may receive a command, an address, data, and the like from the controller 1200 through the channels CH1 to CHk, and output data to the controller 1200.

The controller 1200 may control the storage device 1100 in response to a request received from a host 2000, and output data read from the storage device 1100 to the host 2000. For example, when the controller 1200 receives data together with a program request from the host 2000, the controller 2000 may perform an internal operation on the received data and then store the data in the storage device 1100. The internal operation may include an error check operation on data received from the host 2000, a parity generation operation necessary for the error check operation, an address allocation operation of a memory block, and the like. The controller 1200 may output data stored in the storage device 1100 to the host 2000 in response to a read request from the host 2000, and perform an erase operation of a memory block in the storage device 1100 in response to an erase request from the host 2000.

The controller 1200 may perform a background operation capable of managing the storage device 1100. The background operation is an operation performed to improve the performance of the storage device 1100, and may include garbage collection, wear leveling, and the like. In addition, various operations such as an operation for managing data and an operation for managing an address may be performed in the background operation.

The controller 1200 may perform the background operation when the controller 1200 is in a particular state, which may be predetermined, without any request from the host 2000, and regularly perform the background operation at each of multiple set times, which may be set intervals. Alternatively, the host 2000 may transmit a background operation request to the memory system 1000. Although the controller 1200 is not in the particular state, the controller 1200 may perform the background operation in the background operation request. In the following embodiments, the controller 1200 may calculate a wear acceleration index (WAI) level according to an amount of host data received from the host 2000 and an amount of memory data written to the storage device 1100 in a program operation, and adjusting an operating ratio of the background operation according to the WAI level.

The host 2000 may communicate with the memory system 1000 by using an interface protocol, such as Peripheral Component Interconnect-Express (PCI-e or PCIe), Advanced Technology Attachment (ATA), Serial ATA (SATA), Parallel ATA (PATA), Serial Attached SCSI (SAS), or Non-Volatile Memory Express (NVMe). The interface protocol is not limited to the above-described examples; alternatively, any of various other interface protocols such as a Universal Serial Bus (USB), a Multi-Media Card (MMC), an Enhanced Small Disk Interface (ESDI), and/or Integrated Drive Electronics (IDE) may be used.

Figure 2:
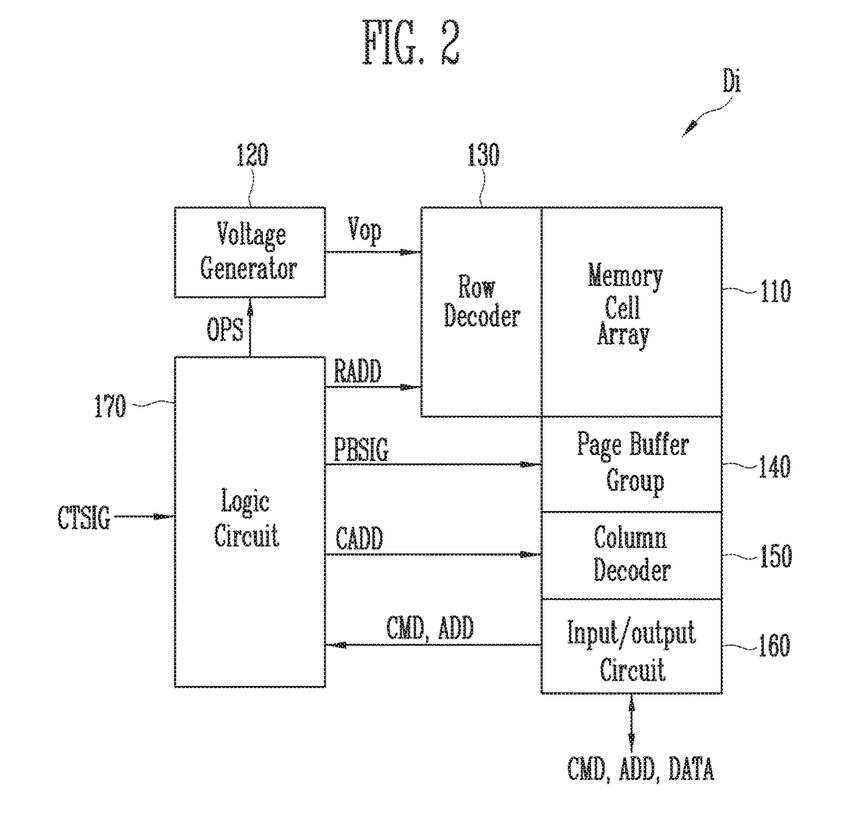
FIG. 2 is a diagram illustrating in detail any one die among a plurality of dies shown in FIG. 1.

FIG. 2 is a diagram illustrating in detail a representative die Di among the plurality of dies shown in FIG. 1.

Referring to FIG. 2, the ith die Di may include a memory cell array 110 configured to store data, a peripheral circuit configured to perform a program, read or erase operation, and a logic circuit 170 configured to control the peripheral circuit.

The memory cell array 110 may include a plurality of memory blocks in which data is stored. Each of the memory blocks may include a plurality of memory cells, and the memory cells may be implemented in a two-dimensional structure in which the memory cells are arranged in parallel to a substrate or a three-dimensional structure in which the memory cells are stacked vertically to a substrate.

The peripheral circuit may include a voltage generator 120, a row decoder 130, a page buffer group 140, a column decoder 150, and an input and output (input/output) circuit 160.

The voltage generator 120 may generate and output operating voltages Vop necessary for various operations in response to an operation signal OPS. For example, the voltage generator 120 may generate and output operating voltages Vop such as a program voltage, a verify voltage, a read voltage, a pass voltage, and an erase voltage.

The row decoder 130 may select one memory block among the memory blocks in the memory cell array 110 according to a row address RADD, and transmit operating voltages Vop to the selected memory block through local lines coupled to the selected memory block.

The page buffer group 140 may include a plurality of page buffers coupled to bit lines, and may temporarily store data in a program or read operation in response to a page buffer control signal PBSIG. Each of the page buffers may include a plurality of latches for temporarily storing data in a program, read, and verify operations.

The column decoder 150 may transfer data received from the input/output circuit 160 in a program operation to the page buffer group 140 or transfer data received from the page buffer group 140 in a read operation to the input/output circuit 160, in response to a column address CADD.

The input/output circuit 160 may be coupled to the controller 1200 shown in FIG. 1 through input/output lines of a channel, and input/output a command CMD, an address ADD, and data DATA through the input/output lines. For example, the input/output circuit 160 may transmit the command CMD and the address ADD, which are received from the controller 1200, to the logic circuit 170, and transmit the data DATA received from the controller 1200 to the column decoder 150. Also, the Input/output circuit 160 may output data DATA received from the column decoder 150 in a read operation to the controller 1200 through the input/output lines.

The logic circuit 170 may control the components 120 to 160 of the peripheral circuit in response to control signals CTSIG received through the channel and the command CMD and the address ADD, which are received from the input/output circuit 160. The control signals CTSIG may include a chip enable signal, an address latch enable signal, a write enable signal, and the like. These signals are known in the art, and therefore detailed description thereof is omitted.

The logic circuit 170 may output the operation signal OPS and the page buffer control signal PBSIG in response to the command CMD, and output the row address RADD and the column address CADD in response to the address ADD.

Figure 3:
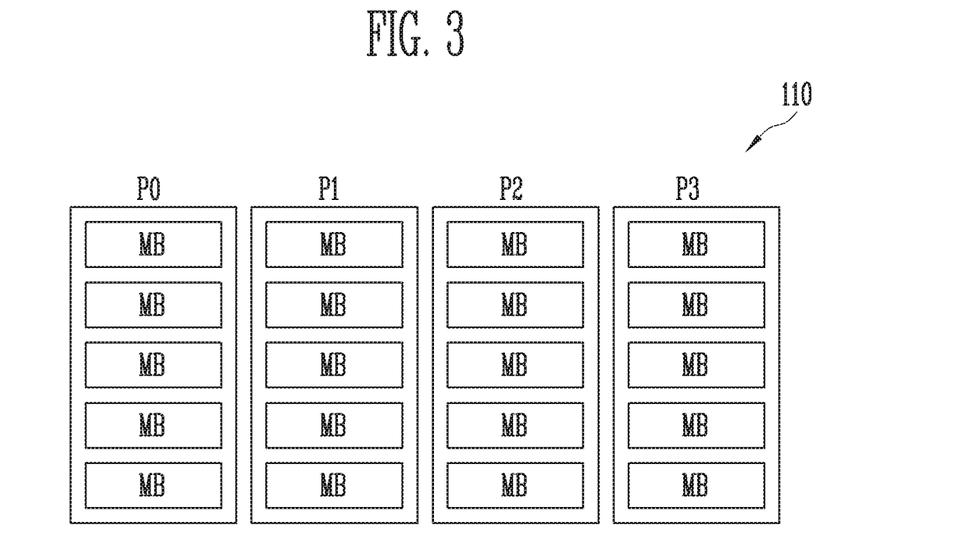
FIG. 3 is a diagram illustrating a configuration of a memory cell array.

FIG. 3 is a diagram Illustrating a configuration of the memory cell array 110.

Referring to FIG. 3, the memory cell array 110 may include a plurality of memory blocks MB, which may be divided into a plurality of planes P0 to P3. For example, when four planes P0 to P3 are included in the memory cell array 110, the planes P0 to P3 have different physical addresses, and hence memory blocks in the different planes P0 to P3 also have different physical addresses.

Each of the memory blocks MB may include a plurality of strings, and a plurality of memory cells may be included in each of the strings. Among normal memory blocks, a memory block on which a program operation can be performed is referred to as an open block, and a memory block on which an additional program operation cannot be performed since the memory block has been completely programmed is referred to as a closed block.

In a program operation, data received from the controller 1200 may be distributed and written in a plurality of open blocks, and a portion of valid data may be changed into invalid data by various operations performed subsequently. For example, when an erase operation is performed, the controller 1200 performs erase processing on corresponding data. However, the controller 1200 may preferentially perform erase processing on a physical address at which the corresponding data is stored, and a erase operation on the corresponding data may be subsequently performed. The number of open blocks may be decreased as the invalid data is increased. Thus, the controller 1200 can improve the performance of the storage device 1100 by performing a background operation. The background operation may be performed to compensate for performance degradation caused by various causes in addition to the above-described cause. A detailed configuration of the controller 1200 for controlling the background operation is described as follows.

Figure 4:
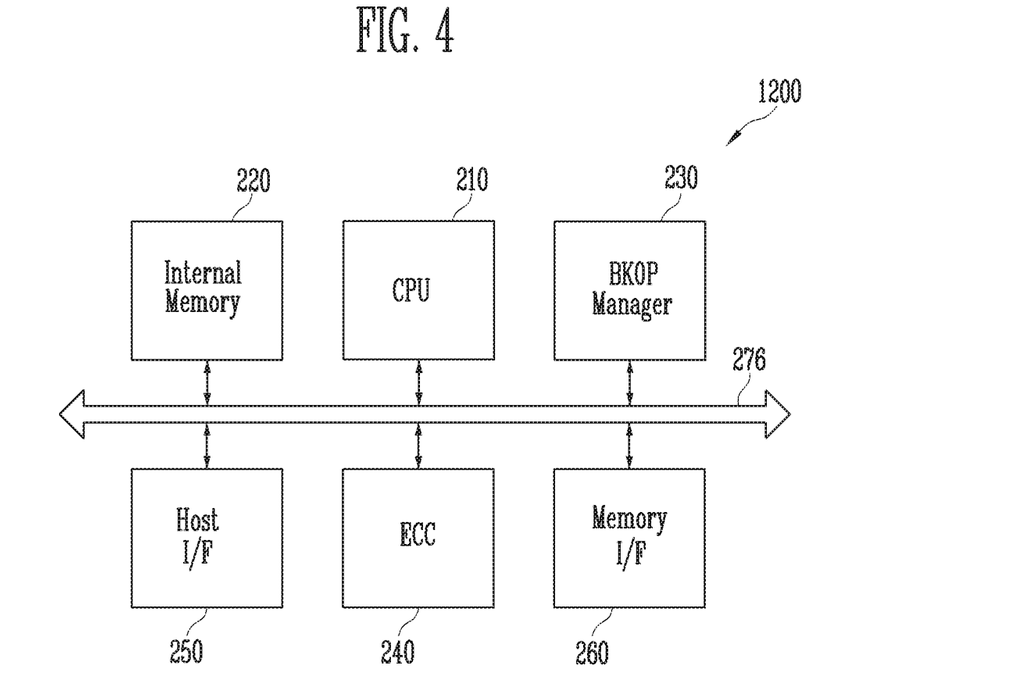
FIG. 4 is a diagram illustrating a controller in accordance with an embodiment of the present disclosure.

FIG. 4 is a diagram illustrating a controller 1200 in accordance with an embodiment of the present disclosure.

Referring to FIG. 4, the controller 1200 may include a central processing unit (CPU) 210, an internal memory 220, a background operation (BKOP) manager 230, an error correction component (ECC) 240, a host interface (I/F) 250, and a memory interface (I/F) 260, which communicate with each other through a bus 276.

The CPU 210 may The CPU 210 may control the storage device 1100 in response to a request RQ from the host 2000 shown in FIG. 1. For example, when the request RQ is received from the host 2000, the CPU 210 may generate and output a command set by combining a command for controlling the storage device 1100, such as a program, read or erase command, and an address in response to the received request. When no request is received from the host 2000, the CPU 210 may perform a background operation for improving the performance of the memory system 1000 shown in FIG. 1. In this embodiment, the CPU 210 may perform the background operation by adjusting an operating ratio of the background operation in response to a background signal output from the background operation manager 230.

The internal memory 220 may temporarily store various data necessary for an operation of the controller 1200, or temporarily store data in a program or read operation. For example, the internal memory 220 may be implemented with a dynamic random access memory (DRAM), a static random access memory (SRAM), or a nonvolatile memory. The internal memory 220 may store various addresses necessary for an operation of the memory system 1000, and store and update various status information of memory blocks corresponding to each address. For example, the internal memory 220 may store a mapping table of logical and physical addresses, and output a selected address in response to a request from the CPU 210.

The background operation manager 230 may output a background operation (BKOP) signal for selecting an operating ratio of the background operation according to an amount of data. For example, the background operation manager 230 may calculate wear acceleration index (WAI) according to the amount of data, select a background operation level according to the calculated WAI, and then output the BKOP signal according to the selected background operation level.

The error correction component 240 may detect and correct an error of data in a program or read operation. For example, the error correction component 240 may encode data received from the host 2000 in the program operation, and decode data received from the storage device 1100 in the read operation. A low density parity check (LDPC) code may be used for encoding or decoding, and an error correction operation using various kinds of codes in addition to the LDPC code may be performed. In addition, the data received from the host 2000 in the program operation may be changed into random data through a randomization phase, and a parity may be generated in an encoding operation for checking an error of the random data. Since both the random data and the parity are written to the storage device 1100, a larger amount of data than that received from the host 2000 in the program operation can be written to the storage device 1100. A randomizer for changing data received from the host 2000 into random data may be included in the error correction component 240 or be configured as a separate device.

The host interface 250 may communicate a request, an address, and data DATA between the controller 1200 and the host 2000. For example, the host interface 250 may include any of various interfaces such as Peripheral Component Interconnect-Express (PCI-e or PCIe), Advanced Technology Attachment (ATA), Serial ATA (SATA), Parallel ATA (PATA), Serial Attached SCSI (SAS), Non-Volatile Memory Express (NVMe), a Universal Serial Bus (USB), a Multi-Media Card (MMC), an Enhanced Small Disk Interface (ESDI), and/or Integrated Drive Electronics (IDE).

The memory interface 260 may communicate a command, an address, and data between the controller 1200 and the storage device 1100. For example, the memory interface 260 may communicate with a selected die of the storage device 1100 through a plurality of channels.

Figure 5:
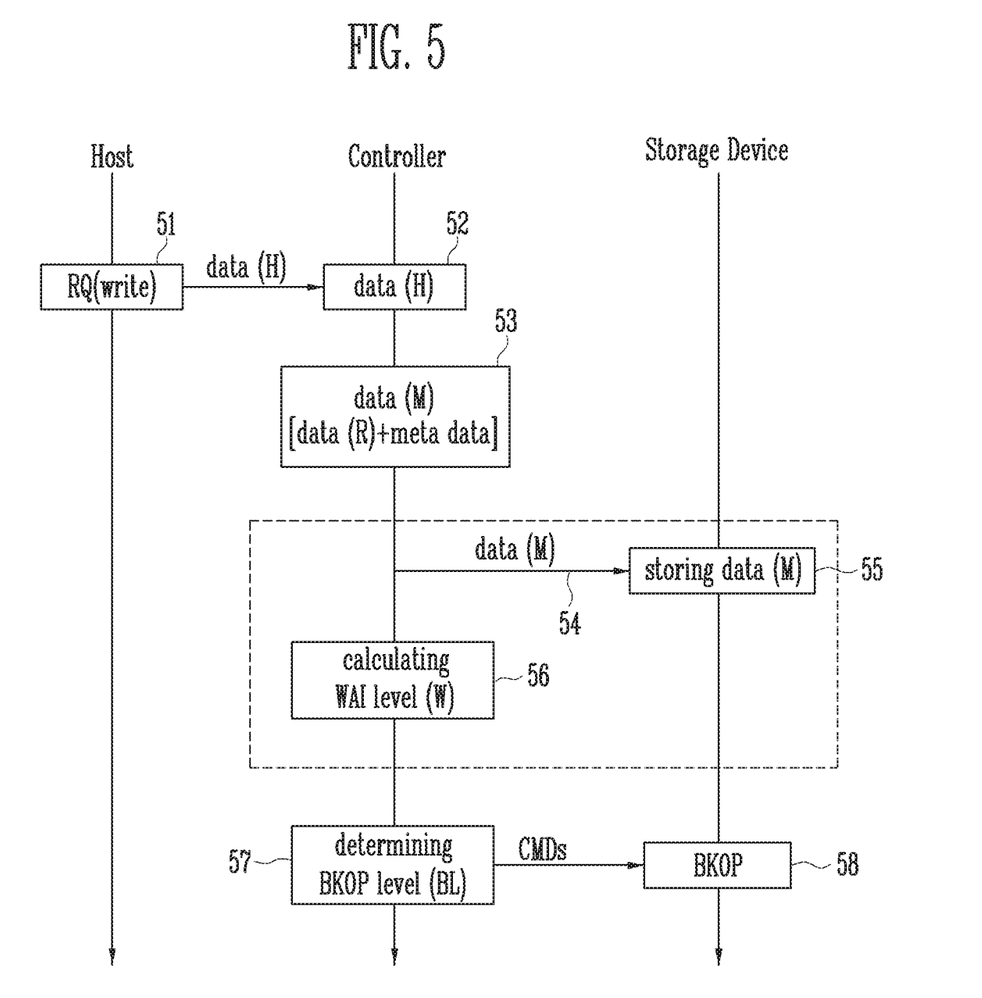
FIG. 5 is a diagram illustrating a background operation in accordance with a first embodiment of the present disclosure.

FIG. 5 is a diagram illustrating a background operation in accordance with a first embodiment of the present disclosure. For example, the background operation may be performed by the host 2000 and the memory system 1000 including the storage device 1100 and the controller 1200 of FIG. 1.

Referring to FIG. 5, the host may output a request RQ for a program (or write) operation and host data (data (H)) in the program operation (51). The host data refers to data to be programmed, i.e., user data.

After the controller receives the request RQ and the host data, the controller may generate memory data (data (M)) by performing an internal operation on the host data (53). That is, the host data may be converted into the memory data by the controller. For example, the controller may convert the host data into random data (data (R)) by randomizing the host data. In addition, a parity may be generated while internal operations such as a randomization operation and an error check operation are being performed. That is, when the host data is received from the host, the controller may generate the random data and the memory data including the parity generated by the internal operation. In addition to the parity, meta data including information of the memory system, which is changed due to the program operation, may be generated. The meta data may also be included in the memory data.

Since a capacity of the random data may be equal to that of the host data, a capacity of the memory data to which the parity and the meta data are added may be greater than that of the host data. In addition, the capacity of memory data corresponding to a selected memory block may be reset when the selected memory block is open for the first time.

The controller may transmit the memory data together with a program command to the storage device (54).

The storage device may store the memory data in the selected memory block in response to the program command (55). For example, the storage device may write the random data and the parity, which are Included in the memory data, to a selected open block.

After the controller transmits the memory data to the storage device (54), the controller may calculate a wear acceleration index (WAI) W by performing a calculation operation, based on an amount of data (56). For example, the controller may calculate a WAI level W by performing a calculation operation on an amount of the host data H and an amount of the memory data M as shown in Equation 1.

$$W = \frac{M}{H} \qquad \text{Equation 1}$$

Referring to Equation 1, the WAI level W may be a ratio of the amount of the memory data M to the amount of the host data H. Since M is always greater than H, the WAI level W may be always calculated as a positive rational number. That is, the number of memory blocks used should be increased as the amount of data generated to perform an internal operation of the memory system is increased in addition to data received from the host. Therefore, the necessity of the background operation may be increased.

Accordingly, the controller in accordance with this embodiment may determine a background operation (BKOP) level BL according to the WAI level W (57), and output a background command set CMDs by adjusting an operating ratio of the background operation, based on the determination result. A command and addresses of memory blocks and a page, on which the background operation is to be performed, may be included in the background command set CMDs. For example, the controller may sequentially output a program, read or erase command according to a required background operation, and output an address of a memory block or page that becomes a target of each command when the command is output.

The controller may control the address of a target block or page according to the operating ratio of the background operation. For example, the controller may increase the number of memory blocks or pages that become targets of the background operation as the operating ratio of the background operation is increased. For another example, the controller may decrease the number of memory blocks or pages that become targets of the background operation as the operating ratio of the background operation is decreased. When it is determined that the background operation is unnecessary since the BKOP level BL is very low, the controller may not output the background command set CMDs.

When a background command set CMDs is received from the controller, the storage device may perform the background operation BKOP in response to the received background command set CMDs (58).

That is, whenever a program request is output from the host, the controller may store and update the amount H of the host data and the amount M of the memory data, and calculate a WAI level W according to an amount of the stored data. The calculated WAI level W corresponds to a ratio of an amount of data increased in the memory system to the amount of the host data H received from the host. Therefore, the controller may increase the operating ratio of the background operation as the amount of data Increased in the memory system becomes larger, and decrease the operating ratio of the background operation as the amount of data increased in the memory system becomes smaller. Accordingly, an unnecessary background operation may be suppressed.

In the background operation in accordance with the first embodiment of the present disclosure, the operation order of the steps 54, 55, and 56 may be changed. This is described as a second embodiment with reference to FIG. 6.

Figure 6:
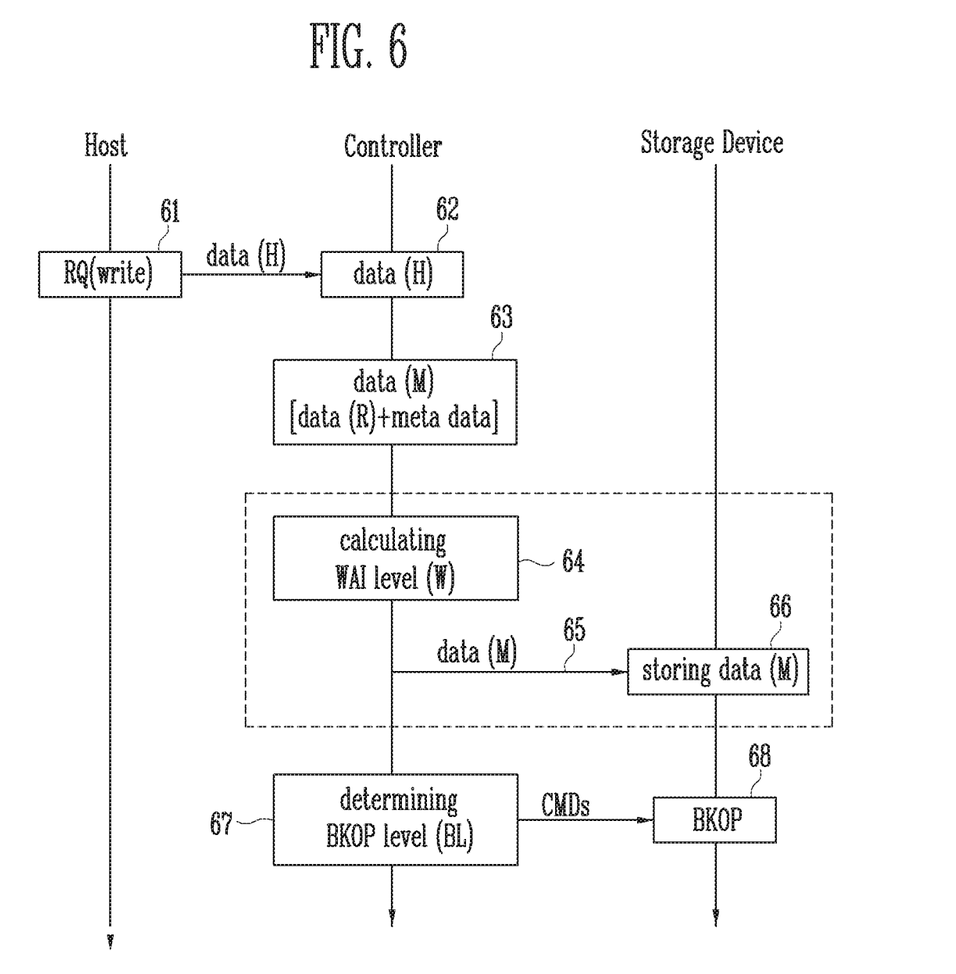
FIG. 6 is a diagram illustrating a background operation in accordance with a second embodiment of the present disclosure.

FIG. 6 is a diagram illustrating a background operation in accordance with a second embodiment of the present disclosure. For example, the background operation may be performed by the host 2000 and the memory system 1000 including the storage device 1100 and the controller 1200 of FIG. 1.

Referring to FIG. 6, steps 61 to 63 may be performed identically to the steps 51 to 53 described in FIG. 5. When memory data is generated in the step 63, the controller may calculate a wear acceleration index (WAI) W (64) and then transmit the memory data to the storage device (65).

The storage device may store the memory data in a selected memory block in response to a program command (66).

After the controller transmits the memory data to the storage device (65), steps 67 and 68 may be performed the same as the steps 57 and 58 described in FIG. 5.

Although a case where the controller performs the background operation without any request from the host is illustrated in FIGS. 5 and 6, the host may also transmit a background request to the memory system. This is described as a third embodiment with reference to FIG. 7.

Figure 7:
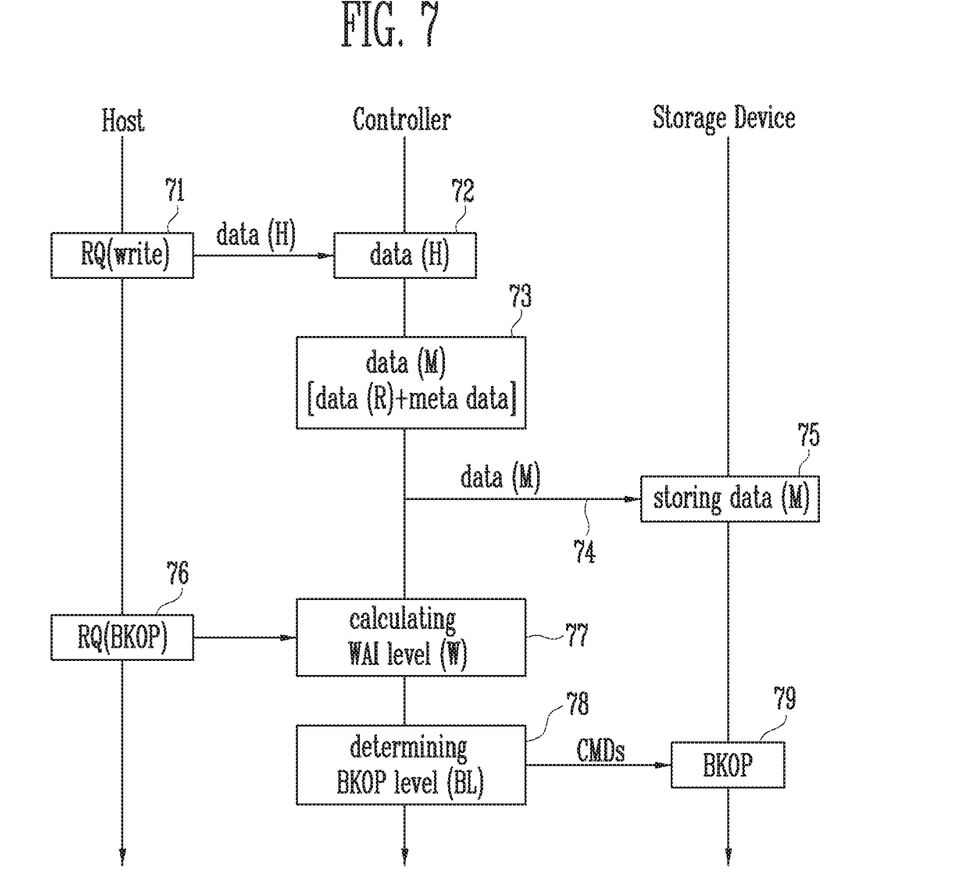
FIG. 7 is a diagram illustrating a background operation in accordance with a third embodiment of the present disclosure.

FIG. 7 is a diagram illustrating a background operation in accordance with a third embodiment of the present disclosure. For example, the background operation may be performed by the host 2000 and the memory system 1000 including the storage device 1100 and the controller 1200 of FIG. 1.

Referring to FIG. 7, steps 71 to 75 may be performed identically to the steps 51 to 55 described in FIG. 5.

When a request RQ for a background operation (BKOP) is received from the host (76) after the controller transmits memory data to the storage device (74), the controller may calculate a wear acceleration index (WAI) W according to an amount of data (77). That is, the controller may autonomously perform the background operation even when the controller does not receive the request RQ for the background operation from the host as described in the first and second embodiments. When the controller receives the request RQ for the background operation from the host as described in the third embodiment shown in FIG. 7, the controller may calculate a WAI level W by performing a calculation operation for the background operation (77).

Subsequently, the controller may determine a BKOP level BL according to the WAI level W (78), and output a background command set CMDs by adjusting an operating ratio of the background operation, based on the determination result. However, when it is determined that the background operation is unnecessary since the BKOP level BL is very low, the controller may output a signal representing that the background operation is unnecessary to the host.

When a background command set CMDs is received from the controller, the host may perform the background (BKOP) operation in response to the received background command set CMDs (79).

Figure 8:
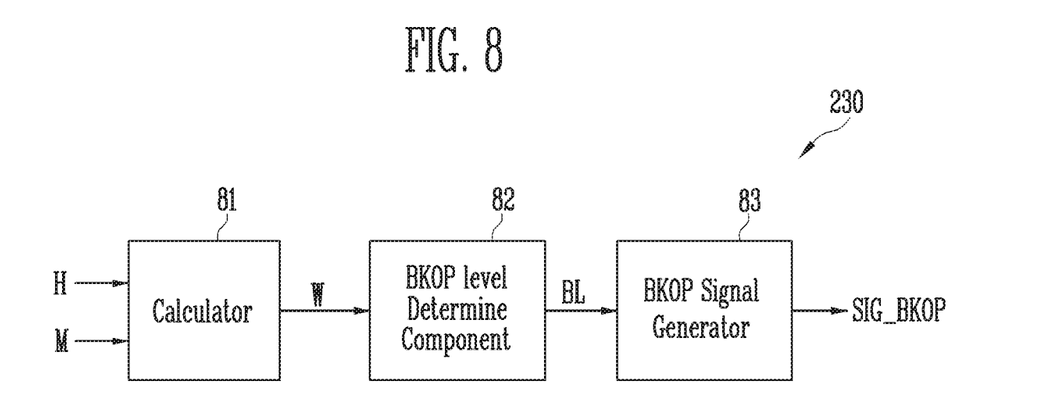
FIG. 8 is a diagram illustrating a background operation manager in accordance with an embodiment of the present disclosure.

FIG. 8 is a diagram illustrating a background operation (BKOP) manager 230 in accordance with an embodiment of the present disclosure.

Referring to FIG. 8, the BKOP manager 230 may calculate a wear acceleration index (WAI) level W according to amounts of data H and M, select a BKOP level BL according to the WAI level W, and then output a BKOP signal SIG_BKOP according to the selected BKOP level BL. The BKOP manager 230 that outputs the BKOP signal SIG_BKOP according to the amounts of data H and M may be configured as follows.

The BKOP manager 230 may include a calculator 81, a background operation (BKOP) level determination component 82, and BKOP signal generator 83.

The calculator 81 may store information of an amount of host data H and an amount of memory data M, and calculate a WAI level W by performing a calculation operation on the amounts of stored data H and M. H represents an amount of data received from the host in a program operation, and M represents an amount of data generated by changing host data received from the host according to an internal operation of the controller. For example, when host data is received from the host, the controller may generate random data by randomizing the received host data. Memory data may be generated adding meta data generated in this process to the random data. Therefore, the amount of memory data M is greater than the amount of host data H. The calculator 81 may calculate a WAI level W by performing a calculation operation on the amounts of data H and M according to the above-described Equation 1.

When a WAI level W is received, the BKOP level determination component 82 may output a BKOP level BL corresponding to the WAI level W. Detailed description of this aspect is provided below with reference to FIG. 9.

The BKOP signal generator 83 may output a BKOP signal SIG_BKOP in response to the BKOP level BL. The BKOP signal SIG_BKOP may vary depending on the input BKOP level BL. Therefore, when the BKOP level BL is configured to represent any of three output levels, the BKOP signal SIG_BKOP may be output in the form of a code including a plurality of bits, where the code indicates the particular output level.

Figure 9:
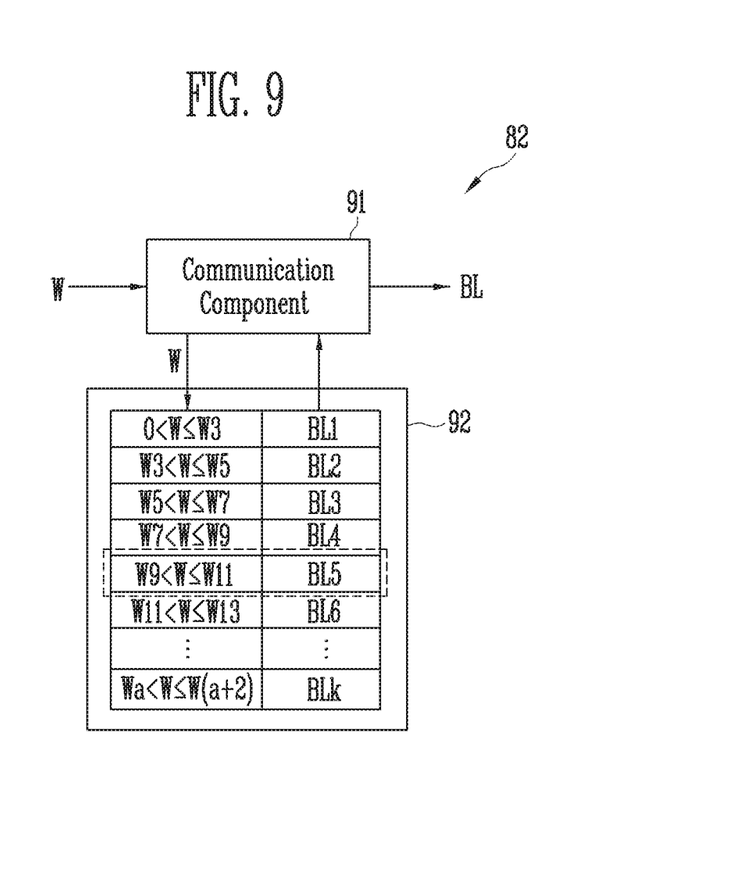
FIG. 9 is a diagram illustrating a background operation level determination component shown in FIG. 8.

FIG. 9 is a diagram illustrating the BKOP level determination component shown in FIG. 8.

Referring to FIG. 9, the BKOP level determination component 82 may include a communication component 91 and a register 92.

When a WAI level W is received, the communication component 91 may transmit the WAI level W to the register 92. When the communication component 91 receives a BKOP level BL from the register 92, the communication component 91 may output the receive BKOP level BL.

The register 92 may store a background table. For example, the background table may include indices divided using ranges of a plurality of WAI levels W and BKOP levels BL respectively corresponding to the indices. The background table may be set and stored in advance when the memory system is manufactured. The ranges of the WAI levels W and the BKOP levels BL may be differently set depending on storage devices. For example, the ranges of the WAI levels W and the BKOP levels BL may be differently set depending on numbers of dies, memory blocks, and pages, which are included in the storage device. For another example, the ranges of the WAI levels W and the BKOP levels BL may be differently set depending on various electrical characteristics of the storage device.

The background table shown in FIG. 9 is exemplary; therefore, the ranges of the WAI levels W and the BKOP levels BL are not limited to numerical values shown in FIG. 9.

In the exemplary background table shown in FIG. 9, the ranges of the WAI levels W may be divided as follows: $0<W\leq3$, $W3<W\leq W5$, $W5<W\leq W7$, $W7<W\leq W9$, $W9<W\leq W11$, $W11<W\leq W13$, ..., and $Wa<W\leq W(a+2)$, and different BKOP levels BL may correspond to the respective ranges. For example, a first BKOP level BL1 may correspond to the range $0<W\leq3$ in which the WAI level W is lowest, and a second BKOP level BL2 may correspond to the range $W3<W\leq W5$ greater than the range $0<W\leq3$.

That is, the first BKOP level BL1 means that the necessity of the background operation is lowest, and the second BKOP level BL2 means that the necessity of the background operation is greater than that at the first BKOP level BL1.

In this manner, a kth BKOP level BLk may correspond to the range $Wa<W\leq W(a+2)$ in which the WAI level W is highest. The kth BKOP level BLk means that the necessity of the background operation is highest.

An operating method of the controller including the above-described devices is described as follows.

Figure 10:
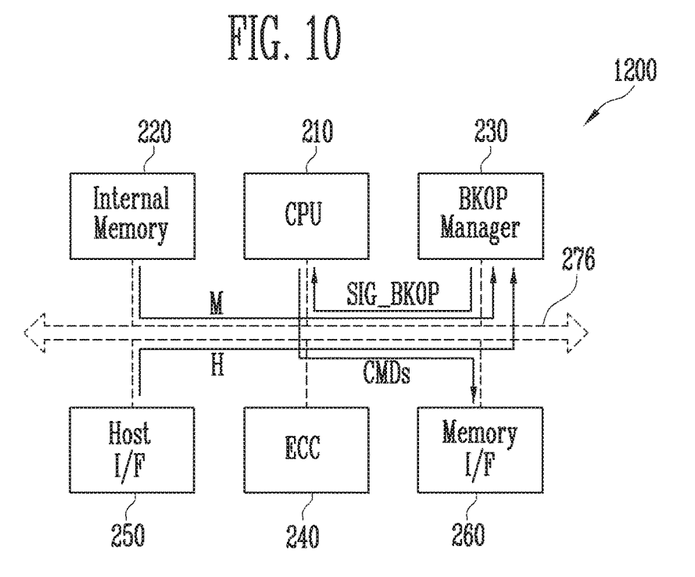
FIG. 10 is a diagram illustrating an operating method of the controller in accordance with an embodiment of the present disclosure.

FIG. 10 is a diagram illustrating an operating method of the controller in accordance with an embodiment of the present disclosure.

Referring to FIG. 10, host data received from the host in a program operation may be input to the host interface (I/F) 250. The host interface 250 may transmit information on an amount of input host data H to the background operation manager 230. The CPU 210 may generate memory data by randomizing the host data and performing an error check operation, using the error correction component 240, in response to a program request received from the host. The generated memory data may be temporarily stored in the internal memory 220. The internal memory 220 may transmit information on an amount of memory data M to the background operation manager 230.

The background operation manager 230 may generate a WAI level and a BKOP level, based on the information on H and on M, and output a BKOP signal SIB_BKOP according to the BKOP level.

The CPU 210 may output a background command set CMDs by adjusting an operating ratio of a background operation according to the BKOP signal SIB_BKOP. The memory interface 260 may transmit the background command set CMDs to the storage device, and the storage device may perform the background operation according to the background command set CMDs.

Figure 11:
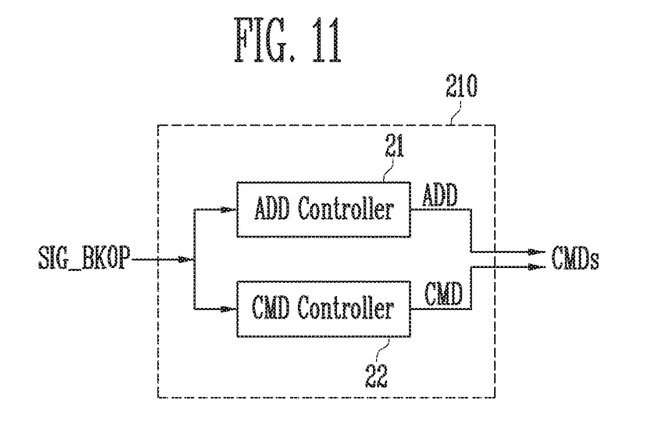
FIG. 11 is a diagram illustrating a central processing unit shown in FIG. 10.
Figure 12:
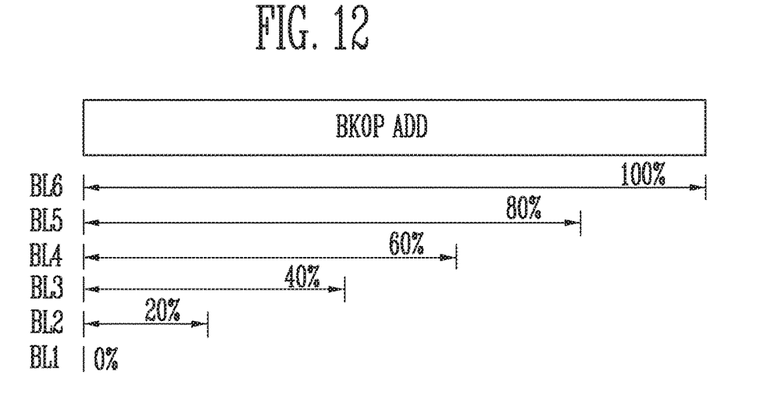
FIG. 12 is a diagram illustrating an operating ratio of a background operation according to a background operation level.

FIG. 11 is a diagram illustrating the CPU 210 shown in FIG. 10. FIG. 12 is a diagram illustrating an operating ratio of a background operation according to a background (BKOP) level.

Referring to FIG. 11, the CPU 210 may output a background command set CMDs by changing an operating ratio of a background operation depending on a BKOP signal SIG_BKOP. The operating ratio of the background operation may be changed depending on an address, and the CPU 210 may include an address (ADD) controller 21 and a command (CMD) controller 22 so as to control the address.

Both the address controller 21 and the command controller 22 may operate in response to the BKOP signal SIG_BKOP. However, the address controller 21 may output an address ADD, and the command controller 22 may output a command CMD.

The address controller 21 may select and output an address ADD of a memory block or page that becomes a target of the background operation in response to the BKOP signal SIG_BKOP. That is, the address ADD output from the address controller 21 may be changed depending on the operating ratio of the background operation, which is adjusted in response to the BKOP signal SIG_BKOP.

Referring to FIG. 12, it is assumed that the BKOP level is divided into first to sixth BKOP levels BL1 to BL6, the first BKOP level BL1 of which corresponds to the lowest operating ratio, and the sixth BKOP level BL6 of which corresponds to the highest operating ratio.

When a BKOP signal SIB_BKOP corresponding to the sixth BKOP level BL6 is output, the address controller 21 may output 100% of an address BKOP ADD that becomes a target of the background operation.

When a BKOP signal SIG_BKOP corresponding to the fifth BKOP level BL5 lower than the sixth BKOP level BL6 is output, the address controller 21 may output an address ADD corresponding to 80% of the address BKOP ADD that becomes the target of the background operation. The storage device performs the background operation with an operating ratio of 80%, and thus the time required to perform the background operation may be reduced. When a BKOP signal SIG_BKOP corresponding to the first BKOP level BLK1 is output, the background operation may not be performed.

Referring back to FIG. 11, the address controller 21 may output an address ADD that becomes a target of the background operation by using the above-described method, and the output address ADD may be randomly selected.

The command controller 22 may output a required command CMD of the background operation in response to the BKOP signal SIG_BKOP.

As described above, the address ADD output from the address controller 21 and the command CMD output from the command controller 22 are included in the background command set CMDs, to be transmitted to the memory interface 260.

Figure 13:
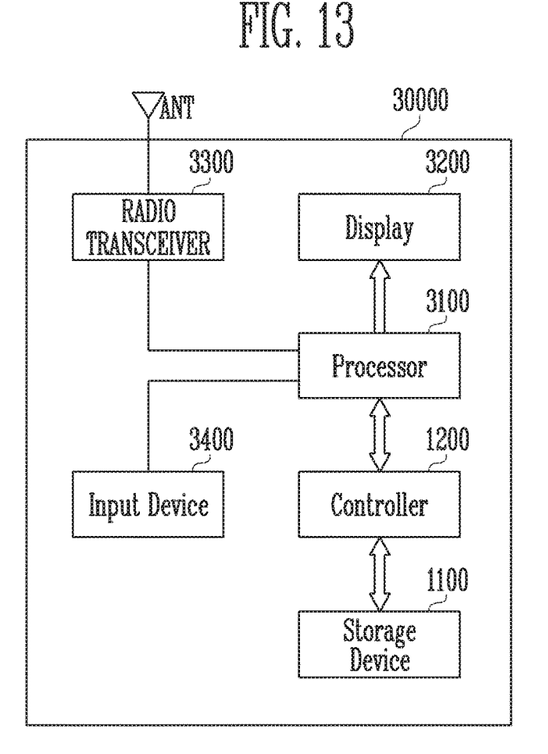
FIG. 13 is a diagram illustrating another embodiment of the memory system including the controller shown in FIG. 1.

FIG. 13 is a diagram illustrating a memory system 30000 as another embodiment of the memory system including the controller shown in FIG. 1.

Referring to FIG. 13, the memory system 30000 may be implemented as a cellular phone, a smart phone, a tablet personal computer (PC), a personal digital assistant (PDA), or a wireless communication device. The memory system 30000 may include a storage device 1100 and a controller 1200 capable of controlling an operation of the storage device 1100. The controller 1200 may control a data access operation of the storage device 1100, e.g., a program operation, an erase operation, a read operation, or the like under the control of a processor 3100.

Data programmed in the storage device 1100 may be output through a display 3200 under the control of the controller 1200.

A radio transceiver 3300 may transmit and receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the controller 1200 or the display 3200. The controller 1200 may transmit the signal processed by the processor 3100 to the storage device 1100.

Also, the radio transceiver 3300 may convert a signal output from the processor 3100 into a radio signal, and output the changed radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the controller 1200, data output from the radio transceiver 3300, or data output from the input device 3400 can be output through the display 3200.

In some embodiments, the controller 1200 capable of controlling an operation of the storage device 1100 may be implemented as a part of the processor 3100, or be implemented as a chip separate from the processor 3100.

Figure 14:
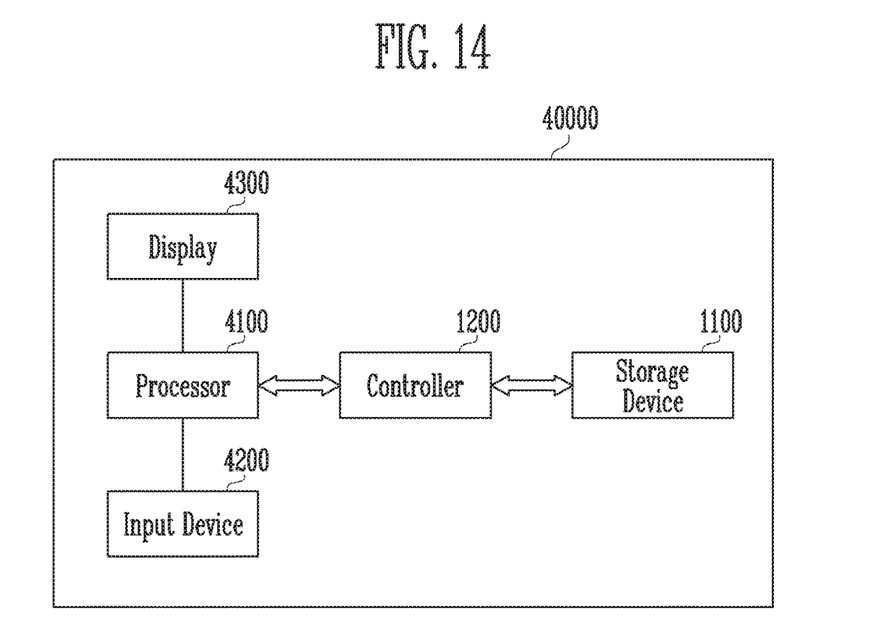
FIG. 14 is a diagram illustrating another embodiment of the memory system including the controller shown in FIG. 1.

FIG. 14 is a diagram illustrating a memory system 40000 as another embodiment of the memory system including the controller shown in FIG. 1.

Referring to FIG. 14, the memory system 40000 may be implemented as a personal computer (PC), a tablet PC, a net-book, an e-reader, a personal digital assistant (PDA), a portable multi-media player (PMP), an MP3 player, or an MP4 player.

The memory system 40000 may include a storage device 1100 configured to store data and a controller 1200 capable of controlling a data processing operation of the storage device 1100.

A processor 4100 may output data stored in the storage device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the controller 1200. In some embodiments, the controller 1200 capable of controlling an operation of the storage device 1100 may be implemented as a part of the processor 4100, or be implemented as a chip separate from the processor 4100.

The controller 1200 may check an operating ratio of a background operation in response to a request from the processor 4100, and perform the background operation by determining whether the background operation is to be performed. The controller 1200 may determine whether the background operation is to be performed by checking a data amount without any request from the processor 4100.

Figure 15:
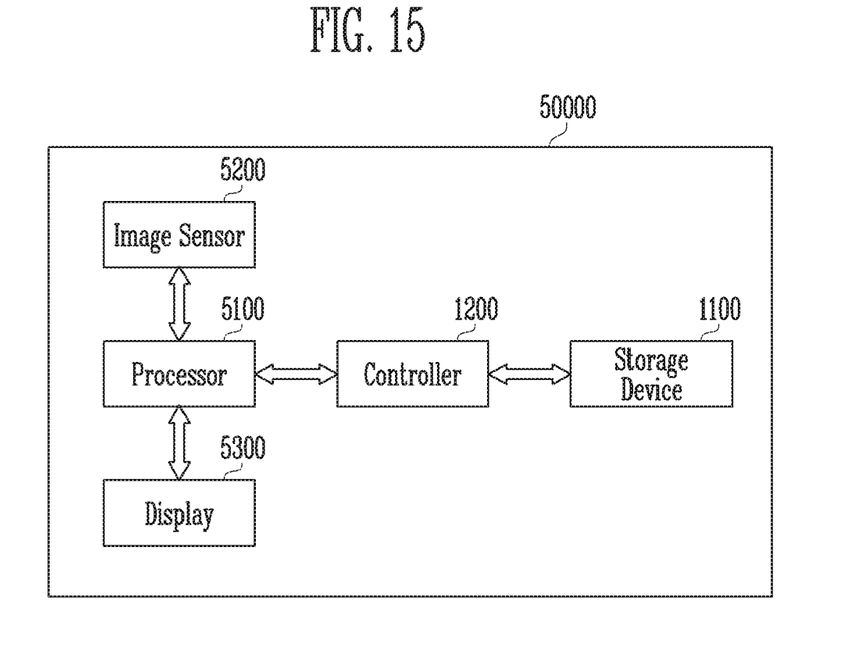
FIG. 15 is a diagram illustrating another embodiment of the memory system including the controller shown in FIG. 1.

FIG. 15 is a diagram illustrating a memory system 50000 as another embodiment of the memory system including the controller shown in FIG. 1.

Referring to FIG. 15, the memory system 50000 may be implemented as an image processing device, e.g., a digital camera, a smart phone having a digital camera attached thereto, or a tablet PC having a digital camera attached thereto.

The memory system 50000 may include a storage device 1100 and a controller 1200 capable of controlling a data processing operation of the storage device 1100, e.g., a program operation, an erase operation, or a read operation.

An image sensor 5200 of the memory system 50000 may convert an optical image into digital signals, and the converted digital signals may be transmitted to a processor 5100 or the controller 1200. Under the control of the processor 5100, the converted digital signals may be output through a display 5300, or be stored in the storage device 1100 through the controller 1200. In addition, data stored in the storage device 1100 may be output through the display 5300 under the control of the processor 5100 or the controller 1200.

In some embodiments, the controller 1200 capable of controlling an operation of the storage device 1100 may be implemented as a part of the processor 5100, or be implemented as a chip separate from the processor 5100.

The controller 1200 may check an operating ratio of a background operation in response to a request from the processor 5100, and perform the background operation by determining whether the background operation is to be performed. The controller 1200 may determine whether the background operation is to be performed by checking a data amount without any request from the processor 5100.

Figure 16:
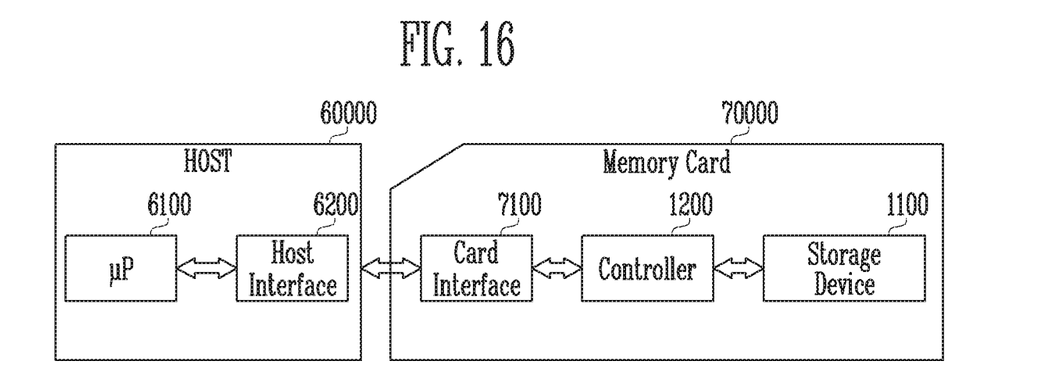
FIG. 16 is a diagram illustrating another embodiment of the memory system including the controller shown in FIG. 1.

FIG. 16 is a diagram Illustrating a memory system 70000 as another embodiment of the memory system including the controller shown in FIG. 1.

Referring to FIG. 16, the memory system 70000 may be implemented as a memory card or a smart card. The memory system 70000 may Include a storage device 1100, a controller 1200, and a card interface 7100.

The controller 1200 may control data exchange between the storage device 1100 and the card interface 7100. In some embodiments, the card interface 7100 may be a secure digital (SD) card interface or a multi-media card (MMC) interface, but the present disclosure is not limited thereto.

The controller 1200 may check an operating ratio of a background operation in response to a request from a host 60000, and perform the background operation by determining whether the background operation is to be performed. The controller 1200 may determine whether the background operation is to be performed by checking a data amount without any request from the host 6000.

The card interface 7100 may interface data exchange between the host 60000 and the controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the storage device 1100 through the card interface 7100 and the controller 1200 under the control of a microprocessor (μP) 6100.

In accordance with embodiments of the present disclosure, the memory system may efficiently perform a background operation according to data throughput.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A controller comprising:
a background operation manager configured to determine a background operation level according to an amount of first data received from a host and an amount of second data generated in a randomization operation and an error check operation of the first data, and output a background operation signal according to the background operation level; and
a processor configured to output a background command set by adjusting an operating ratio of a background operation according to the background operation signal.

2. The controller of claim 1, wherein the background operation manager includes:
a calculator configured to calculate a wear acceleration index (WAI) level by performing a calculation operation on the amount of the first data and the amount of second data;
a background operation level determination component, including a background table in which a plurality of background operation levels respectively correspond to a plurality of WAI level ranges, configured to output a background operation level corresponding to the calculated WAI level; and
a background operation signal generator configured to output the background operation signal in response to the background operation level.

3. The controller of claim 2, wherein the calculator calculates, as the WAI level, a value obtained by dividing the amount of the second data by the amount of the first data.

4. The controller of claim 2, wherein the background operation level determination component includes:
the background table; and
a communication component configured to transmit the WAI level to the background table, and output the background operation level received from the background table,
wherein the background table selects a WAI level range including the WAI level received from the communication component, and transmits the background operation level corresponding to the selected WAI level range to the communication component.

5. The controller of claim 2, wherein the background operation signal generator outputs different background operation signals depending on received background operation levels.

6. The controller of claim 1, wherein the processor includes:
an address controller configured to output all or some addresses among a plurality of addresses as targets of the background operation according to the background operation signal; and
a command controller configured to output a command for the background operation according to the background operation signal,
wherein the background command set includes the addresses output from the address controller and the command output from the command controller.

7. The controller of claim 6, wherein
the number of addresses output from the address controller increases as the background operation level increases; and
the number of addresses output from the address controller decreases as the background operation level decreases.

8. The controller of claim 1, further comprising:
a host interface configured to receive the first data from the host, and transmit information on the amount of the first data to the background operation manager;
an internal memory configured to temporarily store the second data, and transmit information on the amount of the second data to the background operation manager; and
a memory interface configured to output the background command set to a storage device.

9. A controller comprising:
a calculator configured to calculate a wear acceleration index (WAI) level by performing a calculation operation on an amount of first data and an amount of second data;
a background operation level determination component configured to output a background operation level corresponding to the WAI level; and
a background operation signal generator configured to output a background operation signal such that an operating ratio of a background operation is adjusted in response to the background operation level.

10. The controller of claim 9, wherein the calculator calculates, as the WAI level, a value obtained by dividing the amount of the second data by the amount of the first data.

11. The controller of claim 9, wherein the background operation level determination component includes:
a background table in which a plurality of background operation levels respectively correspond to a plurality of WAI level ranges; and
a communication component configured to transmit the WAI level to the background table, and output the background operation level received from the background table,
wherein the background table selects a WAI level range including the WAI level received from the communication component, and transmits the background operation level corresponding to the selected WAI level range to the communication component.

12. The controller of claim 9, wherein the background operation signal generator outputs different background operation signals depending on received background operation levels.

13. A memory system comprising:
a storage device including a plurality of memory blocks; and
a controller configured to control the storage device in response to a request from a host,
wherein the controller calculates a wear acceleration index (WAI) level according to an amount of first data received from the host and an amount of second data written to the storage device, and outputs a background command set to the storage device by adjusting an operating ratio of a background operation according to the calculated WAI level.

14. The memory system of claim 13, wherein the controller:
changes the first data into random data by performing a randomization operation, when the controller receives the first data from the host; and
outputs, as the second data, meta data together with the random data, the meta data being generated in the randomization operation and an error check operation of the random data.

15. The memory system of claim 13, wherein the controller:
   outputs the background command set by increasing the operating ratio of the background operation as the WAI level increases; and
   outputs the background command set by decreasing the operating ratio of the background operation as the WAI level decreases.

16. The memory system of claim 15, wherein the controller changes the operating ratio of the background operation by controlling a target address of the background operation.

\* \* \* \* \*